Jan. 8, 1952  I. ROBERTS  2,582,068
METHOD AND APPARATUS FOR SEPARATING GASES
Filed Dec. 30, 1948  4 Sheets-Sheet 1

Fig. 1.

INVENTOR.
IRVING ROBERTS.
BY
Brown, Critchlow, Flick & Peckham
his ATTORNEYS.

Jan. 8, 1952            I. ROBERTS            2,582,068

METHOD AND APPARATUS FOR SEPARATING GASES

Filed Dec. 30, 1948            4 Sheets-Sheet 2

Fig. 2

INVENTOR.
IRVING ROBERTS.
BY
Brown, Critchlow, Flick & Peckham
his ATTORNEYS.

Fig. 3.

Patented Jan. 8, 1952

2,582,068

UNITED STATES PATENT OFFICE 2,582,068

METHOD AND APPARATUS FOR SEPARATING GASES

Irving Roberts, Greensburg, Pa., assignor to Elliott Company, Jeannette, Pa., a corporation of Pennsylvania Application December 30, 1948, Serial No. 68,324

11 Claims. (Cl. 62—123)

This invention relates to the separation of gaseous mixtures by refrigeration and liquefaction under pressure. It is particularly applicable to the separation of binary mixtures, such as hydrogen and methane, where the two constituents have widely separated boiling points and where the mixture is available under high initial pressure and it is desired to recover the more volatile constituent at substantially that initial pressure.

In refining processes involving the cracking of petroleum, the residual gases that are obtained after the removal of various light hydrocarbons are usually a mixture, consisting substantially of hydrogen and methane in varying proportions. It is frequently desirable to separate and recover these residual gases, the methane being used for fuel and the hydrogen being used, for example, in various hydrogenation processes associated with petroleum refining. In some of those processes, the hydrogen need not be pure, and a mixture of enriched hydrogen consisting of about 80 per cent hydrogen and 20 per cent methane is satisfactory; in others, it is desirable to have hydrogen of substantial purity, preferably containing less than 2 per cent of methane. Since the residual mixture from the cracking plant is generally available under high pressure on the order of 400 pounds per square inch absolute, and since comparable pressures prevail in hydrogenation processes, it is desirable that the separation of the mixture be carried out in such a way that the hydrogen is recovered with a minimum reduction in its initial pressure.

It is accordingly among the objects of this invention to provide a method and apparatus for separating the constituents of a substantially binary gaseous mixture that is originally under a high initial pressure and for recovering the more volatile constituent, in either a substantially pure or greatly enriched state, with a minimum reduction in that initial pressure.

A further object is to accomplish the foregoing separation and recovery with a minimum expenditure of power and with relatively simple and inexpensive equipment.

In accordance with this invention, a substantially binary gaseous mixture that is available at a high initial pressure is initially cooled to about its dew point by indirect heat exchange with the cold separated products. The mixture is then further cooled and rectified in a dephlegmator, which may be constructed as one unit, or as a plurality of separate interconnected units. Most of the less volatile constituent is there liquefied and separated from the more volatile constituent. The liquefied constituent is expanded to lower its temperature and is then used, together with the enriched more volatile constituent, as a cooling agent in the dephlegmator. Finally the two separated constituents, after being partially warmed in the dephlegmator, are used to effect the initial cooling of the mixture.

If it is desired to recover the more volatile constituent in a substantially pure state, the mixture undergoes the preliminary rectification just described and is then further rectified by dephlegmation at a lower temperature than can be obtained by the foregoing cooling agents. That lower temperature is reached by cooling a section of the dephlegmator (or by cooling a separate dephlegmator unit or units) by a cold fluid that is circulated in an external refrigeration cycle. The products of this further rectification are again used, successively, as cooling agents in the preliminary rectification and in the initial cooling of the mixture.

It is a feature of this invention that the gaseous mixture is separated at substantially its initial pressure and the more volatile constituent is recovered with a minimum reduction in that pressure. The less volatile constituent, on the other hand, is expanded to substantially atmospheric pressure to supply refrigeration to compensate for heat leakage and other thermodynamic losses.

The preferred embodiment of the invention is diagrammatically illustrated in the accompanying drawings, in which Figs. 3 and 4 show modifications thereof for recovering the more volatile constituent in a substantially pure state. The invention is herein described with reference to the recovery of hydrogen from a residual gaseous mixture available at high initial pressure from the cracking of petroleum. It is to be understood, however, that this invention is equally applicable to the separation and recovery of other gases in which one constituent is liquefiable within the ranges of temperature and pressure prevailing in the system.

Figure 1:
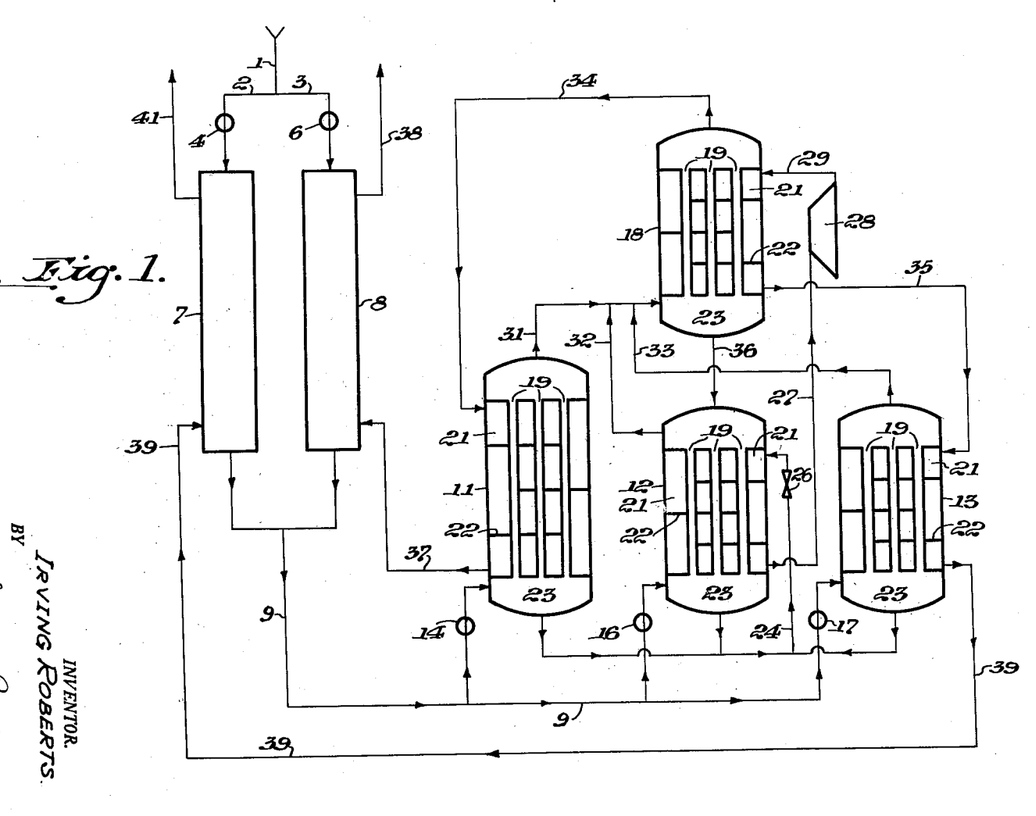
Figs. 1 and 2 show apparatus adapted to recover the more volatile constituent in an impure but greatly enriched state.

Referring to Fig. 1, the gaseous mixture to be separated is obtained from the cracking plant at a pressure of about 415 pounds per square inch absolute. While its composition may vary, a typical mixture contains about 60 per cent methane and 40 per cent hydrogen. The mixture enters the separation plant through a pipe 1, which conducts it to branch pipes 2 and 3, where it is divided into two portions as controlled by valves 4 and 6, respectively. One portion is delivered by pipe 2 to the warm end of exchanger 7, where it is cooled from an initial temperature of about 120° F. to about the dew point of methane (around −182° F. at the prevailing pressure) by indirect heat exchange with cold separated methane. The other portion of the mixture is cooled in exchanges 8 to the substantially same temperature by indirect heat exchange with cold separated hydrogen.

The initially cooled mixture is led by a pipe 9 and its associated branch pipes from the cold ends of both exchangers to the lower portion of three dephlegmator units 11, 12, and 13. A portion of the mixture, as controlled by valves 14, 16, and 17, is admitted to and preliminarily rectified in each of those units. A fourth dephlegmator unit 18 for further rectifying the mixture is connected in series with the other three units. All of the dephlegmator units are of conventional type, being provided with a plurality of tubes 19 for receiving the mixture at their bottom, cooling spaces 21 surrounding those tubes for receiving a cooling fluid, baffles 22 in those spaces for directing the flow of fluid, and a sump 23 for receiving a liquefied constituent of the mixture condensed in the tubes.

In each of the dephlegmator units, the mixture flows upwards through the tubes 19 and is cooled by the fluid surrounding those tubes. As a result, some of the mixture condenses on the tube walls, forming a reflux liquid that trickles down the tubes. There is, accordingly, a stream of gas moving upwards and a stream of cold liquid trickling downwards along the walls of the tubes, and those two streams interact with each other. As this interaction continues throughout the length of the tubes, the liquid trickling down them will gradually become enriched with methane as is flows downwards, and the gaseous mixture will at the same time become enriched with hydrogen as it flows upwards. The liquid collecting in the sump 23 will consist of substantially pure methane, and the gas issuing from the top of the unit will consist largely of hydrogen.

Liquid methane collecting in the sumps 23 of the three dephlegmator units 11, 12, and 13 is led by a pipe 24 to a throttle valve 26, where its pressure is reduced to an intermediate point, preferably about 64 pounds per square inch absolute. This reduction in pressure lowers the temperature of the liquid methane to about −220° F., and the cold throttled liquid is then delivered to the upper portion of the cooling space 21 in dephlegmator unit 12, where it acts as the cooling agent and is evaporated by heat absorbed from the walls of the tubes 19. Finally, when all of the methane has been evaporated and the resulting vapor has been warmed to about −196° F., it leaves the lower part of the cooling space 21 in unit 12 through a pipe 27 and is led to an expansion means, such as an expansion turbine 28. The methane is there expanded with the performance of external work to substantially atmospheric pressure to recool it to about −252° F., which is the lowest temperature prevailing in this embodiment of the system. The expanded methane is then led by a pipe 29 to the upper portion of the cooling space 21 in dephlegmator unit 18, where it acts as the cooling agent in that unit. The mixture that has been partially rectified in dephlegmator units 11, 12, and 13 is delivered by pipes 31, 32, and 33, respectively, to the bottom of the tubes 19 in dephlegmator unit 18, where it is further rectified in the same manner as described above.

The gas leaving the top of the tubes in dephlegmator unit 18 consists of about 82 per cent hydrogen and 18 per cent methane and is at a temperature of about −237° F. This enriched hydrogen is led by a pipe 34 to dephlegmator unit 11, where it acts as the cooling agent in the cooling space surrounding the tubes of that unit. The expanded methane vapor, after it has been used as the cooling fluid in unit 18, is conducted by a pipe 35 to dephlegmator unit 13, where it serves the same purpose. The liquid collecting in the sump 23 of dephlegmator unit 18 is substantially pure methane; it is conveyed by a pipe 36 to the top of the tubes in dephlegmator unit 12 to augment the supply of liquid reflux flowing down the walls of those tubes; it finally augments the supply of liquid in the sump of that unit.

The enriched hydrogen that has been partially warmed in dephlegmator 11 is conducted from the lower part of the cooling space in that unit by a pipe 37 to the cold end of exchanger 8. In flowing through this exchanger, it initially cools a portion of the mixture and finally leaves the exchanger through a pipe 38 at a pressure of about 400 pounds per square inch. The expanded methane that has been partially warmed in unit 13 is led by a pipe 39 to exchanger 7, where it initially cools the other portion of the mixture, and leaves the warm end of exchanger 7 through a pipe 41 at substantially atmospheric pressure.

Figure 2:
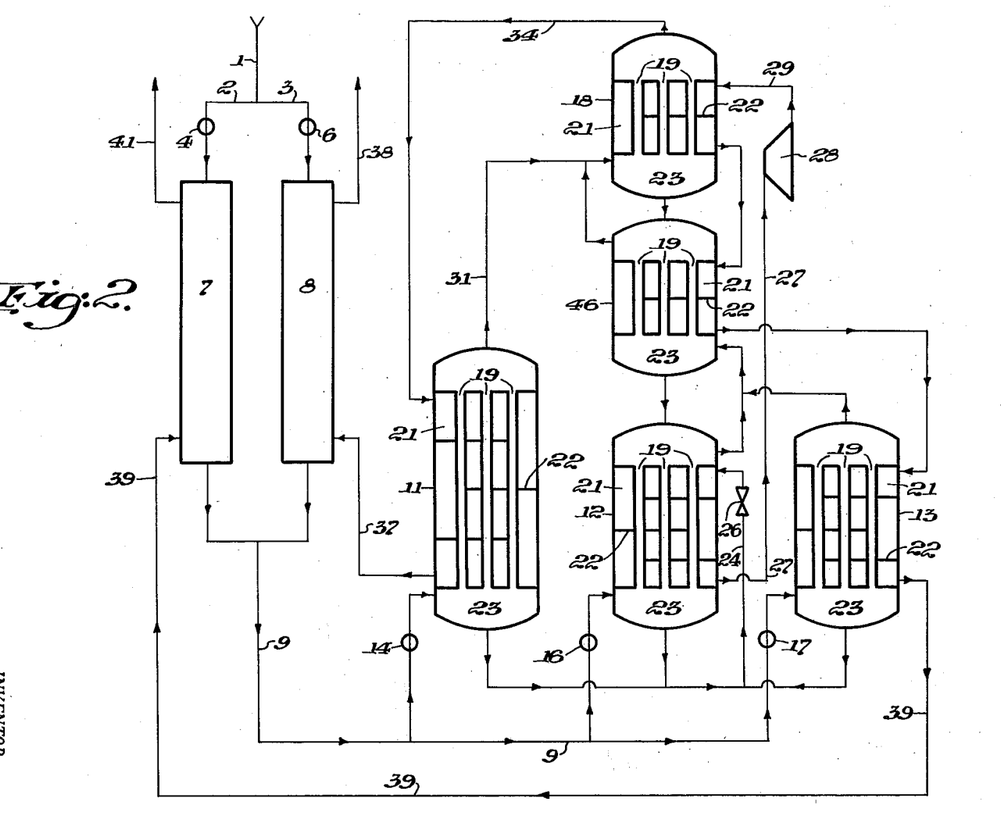

In the foregoing apparatus, the vapor leaving the top of tubes 19 in dephlegmator unit 12 may be slightly warmer than that leaving units 11 and 13. In order to decrease that possible temperature difference before the vapor from all three of these units is finally rectified, a fifth dephlegmator unit may be connected in series between units 12 and 13 on the one hand and unit 18 on the other hand. By introducing this additional unit, the purity of the final hydrogen product will be increased slightly at the expense of providing the additional heat exchange surface represented by the additional unit. Apparatus embodying this modification is shown in Fig. 2, in which the fifth dephlegmator unit, similar to the other units that have been described, is designated by the numeral 46. This additional unit is used to effect an intermediate rectification of the mixture that has been preliminarily rectified in units 12 and 13 and that is to be finally rectified in unit 18. The cooling fluid for this addtional unit is the expanded methane that has been partially warmed in unit 18 before that methane is used as the cooling fluid in unit 13. It is believed that the interconnections between unit 46 and units 12 and 13 and unit 18 are sufficiently clear from Fig. 2 to require no further explanation.

Figure 3:
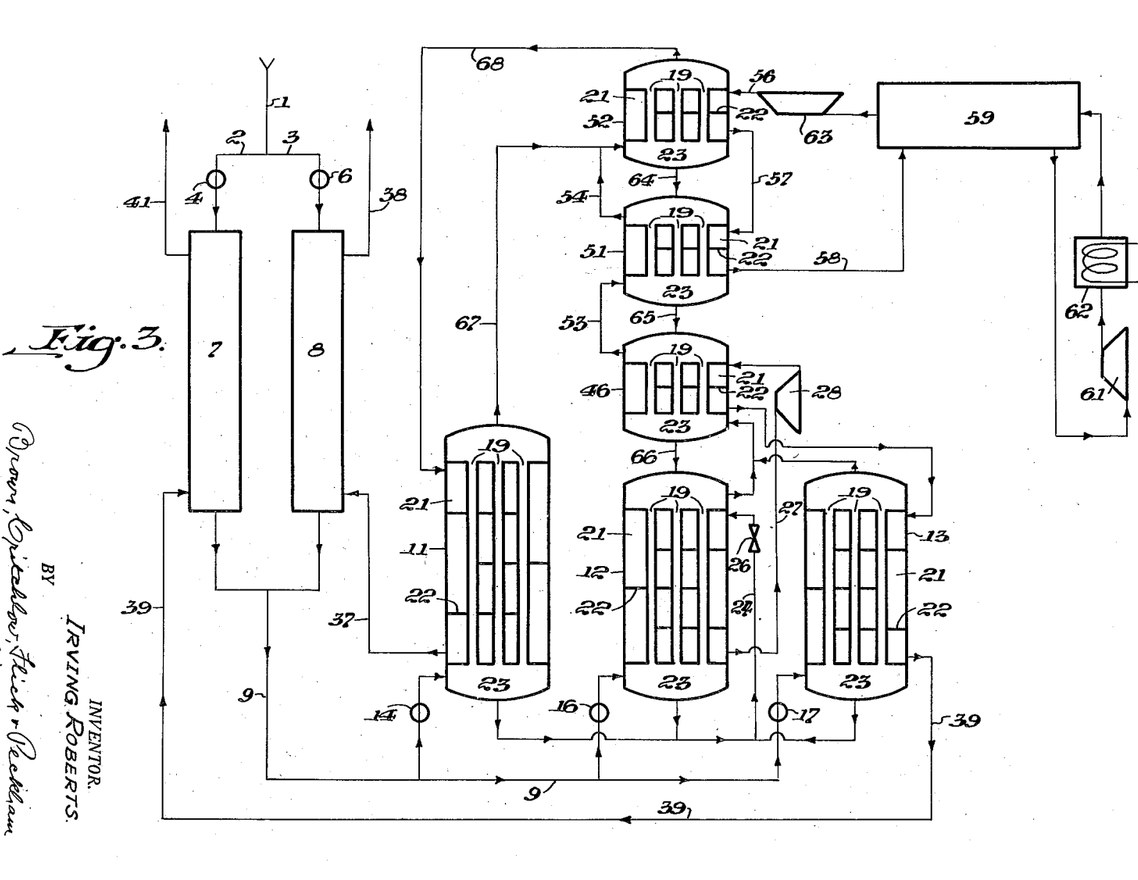
Figure 4:
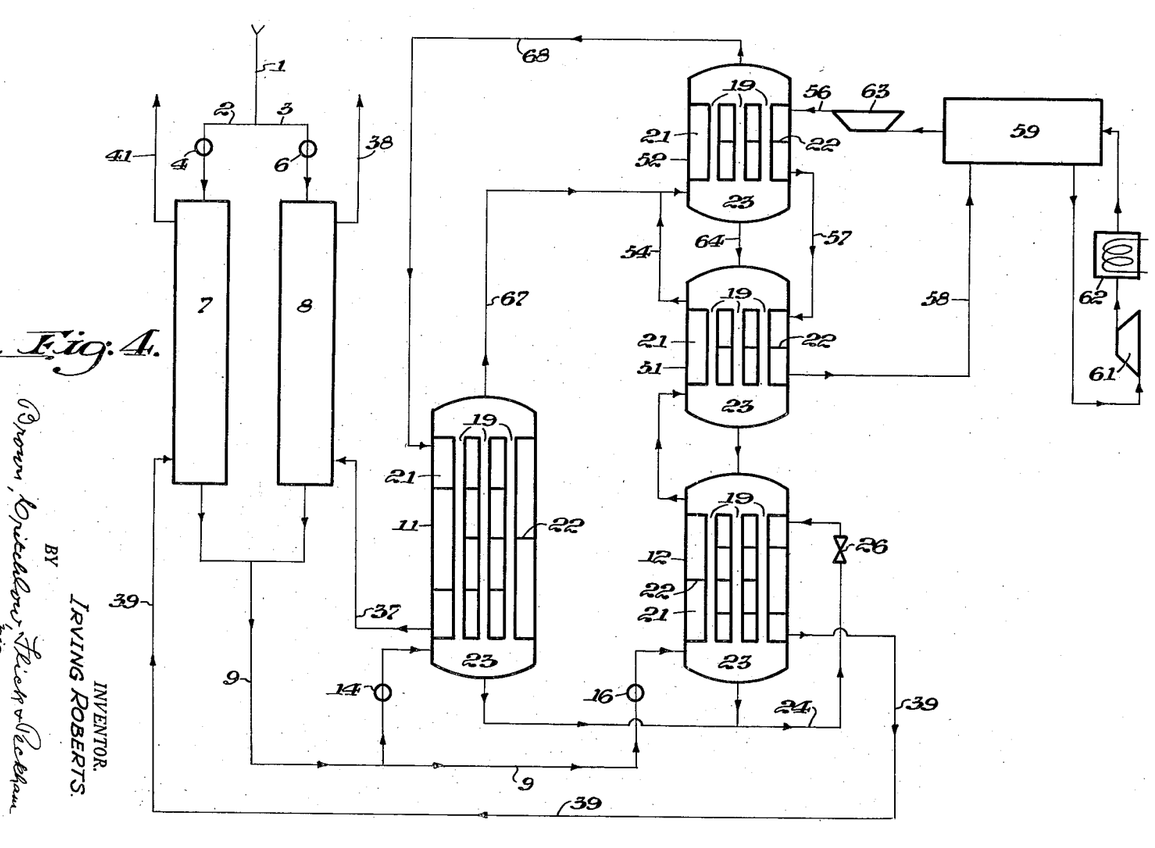

If is desired to recover substantially pure hydrogen, rather than an enriched mixture of it, it is necessary to rectify the mixture still further at a lower temperature than can be obtained by the expansion of methane to atmospheric pressure. Apparatus for accomplishing this further rectification is shown in Figs. 3 and 4. Essentially, this apparatus differs from that previously described by providing an external refrigeration cycle to cool the mixture undergoing dephlegmation to a temperature just above −300° F. A number of refrigerants can be used for this purpose, including the more difficultly liquefiable gases, such as nitrogen, hydrogen, and helium; or even liquefied gases, such as liquid air. For the purpose of describing this invention, it will be assumed that the refrigerant used is air that has been cooled to its saturation temperature by expansion to substantially atmospheric pressure.

Referring to Fig. 3, the mixture to be separated undergoes initial cooling in exchangers 7 and 8 and preleminary rectification in dephlegmator units 11, 12, and 13, as previously described in connection with Fig. 1. The mixture leaving the top of the tubes in units 12 and 13 is further rectified in dephlegmator unit 46 as in Fig. 2, which is cooled by expanded methane vapor. The vapor leaving the top of the tubes in unit 46 consists largely of hydrogen, having about the same composition as the enriched hydrogen recovered in the apparatus shown in Fig. 1. To obtain hydrogen of greater purity, this vapor is still further rectified in additional dephlegmator units 51 and 52, to which it is successively led by pipes 53 and 54, respectively. The cooling fluid in each of those units is cold expanded air that is circulated in an external refrigeration cycle. Air at substantially atmospheric pressure and at a temperature of around −308° F. is led by a pipe 56 to the upper part of the cooling space 21 in dephlegmator unit 52. After being partially warmed in that unit, the air is led by a pipe 57 to unit 51, where it is further warmed to about −281° F. It is then conducted by a pipe 58 to the cold end of a countercurrent heat exchanger 59 and after passing therethrough, to a compressor 61. The air is there compressed to a pressure of around 40 pounds per square inch absolute, or higher; and the heat of compression is removed in an after-cooler 62. The warm compressed air is then led back through exchanger 59, where it is cooled to about −272° F. This cold compressed air is expanded, for example, in an expansion turbine 63, to substantially atmospheric pressure with the performance of external work, thereby lowering its temperature to around −308° F. It is then delivered to pipe 56 and recycled as described.

The enriched hydrogen flowing upwards through the tubes 19 in dephlegmator units 51 and 52 is further cooled by the cold air surrounding those tubes. As a result, substantially all of the methane contained therein is condensed and is led successively from the sump of unit 52 by a pipe 64 to the top of the tubes in unit 51, from the sump of the latter by a pipe 65 to the top of the tubes in unit 46, and then from the sump of unit 46 by a pipe 66 to the top of the tubes in unit 12. In each case, it augments the supply of liquid reflux flowing down the walls of the tubes in those units; and finally it augments the supply of liquid that is throttled and used to cool unit 12.

The enriched hydrogen leaving the top of the tubes in dephlegmator unit 11 is led by a pipe 67 to the bottom of the tubes in dephlegmator unit 52, where it augments the supply of vapor subjected to final rectification in that unit. The gas leaving the top of the tubes in unit 52 is substantially pure hydrogen (it contains less than 2 per cent of methane) at a temperature of about −298° F.; and it is led by a pipe 68 to the cooling space surrounding the tubes in dephlegmator unit 11, where it acts as the cooling agent. The other dephlegmator units 12, 13, and 46 are cooled as previously described in connection with Figs. 1 and 2, and the products of rectification, one of them now consisting of substantially pure hydrogen at about the pressure of the initial mixture, are similarly used to effect the initial cooling of the entering mixture.

In Fig. 4, there is shown a modified form of apparatus for recovering high purity hydrogen. Here, the methane is expanded only once, by throttling it in valve 24 to substantially atmospheric pressure, instead of first throttling it to an intermediate pressure and subsequently expanding it to substantially atmospheric pressure with the performance of external work, as in the apparatus previously described. The throttled methane is then used as the cooling agent in dephlegmator unit 12 alone. This expansion of the methane to substantially atmospheric pressure in one step makes it possible to eliminate dephlegmator units 13 and 46, but requires additional work in compressing more air in the external refrigeration cycle to compensate for the refrigeration previously supplied by the expansion of methane with the performance of external work. The initially cooled mixture, therefore, undergoes primary rectification only in units 11 and 12; and is then further rectified in units 51 and 52, which are cooled by cold expanded air, in the manner previously described in connection with Fig. 3. Again, the hydrogen leaving the lower part of the cooling space in unit 11 and the vaporized methane leaving the lower part of that space in unit 12 are used as the cooling fluids for initially cooling the entering mixture.

The dephlegmators shown in all of the drawings have been represented as separate units, each of which has passages for only two fluids. This has been done to illustrate more clearly the interconnections between those units; but it will, of course, be readily understood that these separate units could, in each case, be combined into a single unit that is divided into sections. Each section would correspond to one of the separate units shown herein and would be of appropriate size to handle the volume of fluids passing therethrough. The sections would be interconnected in the same way as the separate units shown in the drawings.

As a matter of definition, the term "primary dephlegmator" used in the appended claims refers to dephlegmator units 11 and 12, or to units 11, 12 and 13, in which the gaseous mixture is preliminary rectified; the term "secondary dephlegmator" refers to one or more of the other dephlegmator units shown in the drawings, in which the mixture is further rectified. In each case, as pointed out above, those terms also define the primary and secondary sections of a unitary dephlegmator structure in which the mixture is preliminarily and finally rectified.

It will be noted that, in all of the embodiments of this invention, the more volatile constituent of the mixture, consisting either of enriched or substantially pure hydrogen, is recovered at a pressure of about 400 pounds per square inch absolute, i. e., with only a slight reduction in its initial pressure. Such loss of pressure as does occur is due to frictional resistance in the apparatus to the flow of fluids therethrough. The recovery of the more volatile constituent at this high pressure is made possible by rectifying the mixture at substantially its initial pressure and by either expanding with the performance of external work the less volatile constituent of the mixture or using a cold fluid in an external refrigeration cycle, or both, to supply the refrigeration necessary to compensate for heat leakage and other thermodynamic losses.

It is an additional feature of this invention that the rectification is carried out by dephlegmation, permitting the use of apparatus that is less expensive to construct as compared to a conventional high pressure rectifying column and the heat exchangers that would be required in association with such a column.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A method of separating the constituents of a gaseous mixture that is initially at a high pressure and of recovering the more volatile constituent in a greatly enriched state at substantially that initial pressure, that includes the following steps: initially cooling the mixture to about its dew point, dividing the initially cooled mixture into three portions, preliminarily rectifying each portion of the mixture of dephlegmation to liquefy most of its less volatile constituent and thereby separate most of that constituent from the more volatile constituent, further rectifying by dephlegmation the more volatile constituent separated in the preliminary rectification of all three portions of the mixture to liquefy and separate more of the less volatile constituent and thereby increase the purity of the more volatile constituent, throttling liquefied constituent resulting from both of said rectifications to an intermediate pressure to lower its temperature, utilizing the throttled liquid as a cooling agent in the preliminary rectification of the first portion of the mixture and thereby vaporize the liquid, expanding the resulting vapor to substantially atmospheric pressure with the performance of external work to recool it to a lower temperature than before, successively utilizing the expanded vapor as a cooling agent in said further rectification and then as the cooling agent in the preliminary rectification of the second portion of the mixture, utilizing the more volatile constituent resulting from said further rectification as a cooling agent in the preliminary rectification of the third portion of the mixture, and finally utilizing the more volatile constituent and the expanded vapor after both have been utilized as said cooling agents to effect said initial cooling of the mixture.

2. A method of separating the constituents of a gaseous mixture that is initially at a high pressure and of recovering the more volatile constituent in a greatly enriched state at substantially that initial pressure, that includes the following steps: initially cooling the mixture to about its dew point, dividing the initially cooled mixture into three portions, preliminarily rectifying each of said portions by dephlegmation to liquefy most of the less volatile constituent and thereby separate most of that constituent from the more volatile constituent, rectifying a second time by dephlegmation the more volatile constituent separated in the preliminary rectification of the first and second portions of the mixture to separate more of its less volatile constituent, finally rectifying by dephlegmation the more volatile constituent resulting from the preliminary rectification of the third portion of the mixture and that resulting from said second rectification, throttling liquefied constituent resulting from said rectifications to an intermediate pressure to lower its temperature, utilizing the throttled liquid as a cooling agent in the preliminary rectification of the first portion of the mixture and thereby vaporize the liquid, expanding the resulting vapor to substantially atmospheric pressure with the performance of external work to recool it to a lower temperature than before, successively utilizing the expanded vapor as a cooling agent in said final rectification and then in said second rectification and then in said preliminary rectification of the second portion of the mixture, utilizing the more volatile constituent separated in said final rectification as a cooling agent in said preliminary rectification of the third portion of the mixture, and finally utilizing the more volatile constituent and the expanded vapor after both have been partially warmed as cooling agents in said rectifications to effect said initial cooling of the mixture.

3. A method of separating the constituents of a gaseous mixture that is initially at a high pressure and of recovering the more volatile constituent in a substantially pure state at substantially that initial pressure, that includes the following steps: initially cooling the mixture to about its dew point, dividing the initially cooled mixture into three portions, preliminarily rectifying each of said portions by dephelgmation to liquefy most of its less volatile constituent and thereby separate most of that constituent from the more volatile constituent, rectifying a second time by dephelgmation the more volatile constitutent separated in the preliminary rectification of the first and second portions of the mixture to liquefy more of its less volatile constituent, finally rectifying by dephegmation the more volatile constituent resulting from the preliminary rectification of the third portion of the mixture and that resulting from said second rectification, throttling liquefied constituent resulting from said rectifications to an intermediate pressure to lower its temperature, utilizing the throttled liquid as a cooling agent in the preliminary rectification of the first portion of the mixture and thereby vaporize the liquid, expanding the resulting vapor to substantially atmospheric pressure with the performance of external work to recool it to a lower temperature than before, successively utilizing the expanded vapor as a cooling agent in said second rectification and then in the preliminary rectification of the second portion of the mixture, utilizing a cold fluid in an external refrigeration cycle as a cooling agent in said final rectification, utilizing the more volatile constituent resulting from said final rectification as a cooling agent in the preliminary rectification of the third portion of the mixture, and finally utilizing the more volatile constituent and the expanded vapor after both have been partially warmed as cooling agents in said rectifications to effect said initial cooling of the mixture.

4. A method of separating the constituents of a gaseous mixture that is initially at a high pressure and of recovering the more volatile constituent in a substantially pure state at substantially that initial pressure, that includes the following steps: initially cooling the mixture to about its dew point, dividing the initially cooled mixtures into two portions, preliminarily rectifying each of said portions by dephlegmation to liquefy most of its less volatile constituent and thereby separate most of that constituent from the more volatile constituent, rectifying a second time by dephlegmation the more volatile constituent separated in the preliminary rectification of the first portion of the mixture to liquefy more of its less volatile constituent, finally rectifying by dephlegmation the more volatile constituent resulting from both the preliminary rectification of the second portion of the mixture and said second rectification, expanding liquefied constituent resulting from said rectifications to substantially atmospheric pressure to recool it to a lower temperature than before, utilizing the expanded constituent as a cooling agent in the preliminary rectification of the first portion of the mixture, successively utilizing a cold fluid in an external refrigeration cycle as a cooling agent in said final rectification and then in said second rectification, utilizing the more volatile constituent resulting from said final rectification as a cooling agent in the preliminary rectification of the second portion of the mixture and finally reutilizing the more volatile constituent and the expanded less volatile constituent after both have been partially warmed as cooling agents in said rectifications to effect said initial cooling of the mixture.

5. Apparatus for separating the constituents of a gaseous mixture that is initially at a high pressure and for recovering the more volatile constituent at substantially that initial pressure, said apparatus comprising countercurrent heat exchange means for receiving and initially cooling the mixture to about its dew point, conduits dividing the initially cooled mixture into three portions, three primary dephlegmator units, each unit being adapted to receive and initially rectify one of said portions so as to liquefy most of its less volatile constituent and separate that constituent from the more volatile constituent, a fourth dephlegmator unit for receiving and further rectifying the more volatile constituent, a throttle valve for expanding liquefied constituent from said rectifications to an intermediate pressure to lower its temperature, a conduit for delivering the throttled liquid as a cooling fluid to the first dephelgmator unit and thereby evaporate the liquid, expansion means for expanding the resulting vapor to substantially atmospheric pressure with the performance of external work to recool it to a lower temperature than before, conduits for successively delivering the expanded vapor as a cooling fluid to the fourth and then to the second dephelgmator units, a conduit for delivering the more volatile constituent that has been further rectified in the fourth dephelgmator unit to the third dephlegmator unit as a cooling fluid therein, and conduits for delivering the more volatile constituent and the expanded vapor after both have been partially warmed in said dephelgmator units to the countercurrent heat exchange means to effect said initial cooling of the mixture.

6. Apparatus for separating the constituents of a gaseous mixture that is initially at a high pressure and for recovering the more volatile constituent at substantially that initial pressure, said apparatus comprising countercurrent heat exchange means for receiving and initially cooling the mixture to about its dew point, conduits dividing the initially cooled mixture into three portions, three primary dephelgmator units, each unit being adapted to receive and initially rectify one of said portions so as to liquefy most of its less volatile constituent and separate that constituent from the more volatile constituent, an intermediate dephelgmator unit for receiving and further rectifying the more volatile constituent resulting from the initial rectification of two portions of the mixture, a final dephelgmator unit for finally rectifying the more volatile constituent resulting from said initial and further rectifications, a throttle valve for expanding liquefied constituent resulting from said rectifications to an intermediate pressure to lower its temperature, a conduit for delivering the throttled liquid as a cooling fluid to the first primary dephlegmator unit and thereby evaporate the liquid, expansion means for expanding the resulting vapor to substantially atmospheric pressure with the performance of external work to recool it to a lower temperature than before, conduits for successively delivering the expanded vapor as a cooling fluid to the final dephlegmator unit and then to the intermediate dephlegmator unit and then to the second primary dephlegmator unit, a conduit for delivering the more volatile constituent resulting from said final rectification to the third primary dephlegmator unit as a cooling fluid, and conduits for delivering the more volatile constituent from the third primary dephlegmator unit and the expanded vapor from the second dephlegmator unit after both have been partially warmed in said units to the countercurrent heat exchange means to effect said initial cooling of the mixture.

7. Apparatus for separating the constituents of a gaseous mixture that is initially at a high pressure and for recovering the more volatile constituent in a substantially pure state at substantially that initial pressure, said apparatus comprising countercurrent heat exchange means for receiving and initially cooling the mixture to about its dew point, conduits dividing the initially cooled mixture into three portions, three primary dephlegmator units, each unit being adapted to receive and initially rectify one of said portions so as to liquefy most of its less volatile constituent and separate that constituent from the more volatile constituent, two intermediate dephlegmator units for receiving and further rectifying the more volatile constituent resulting from the initial rectification of two portions of the mixture, a final dephlegmator unit for finally rectifying all of the more volatile constituent previously rectified to increase further the purity of that constituent, a throttle valve for expanding liquefied constituent resulting from said rectifications to an intermediate pressure to lower its temperature, a conduit for delivering the throttled liquid as a cooling fluid to the first primary dephlegmator unit and thereby evaporate the liquid, expansion means for expanding the resulting vapor to substantially atmospheric pressure with the performance of external work to recool it to a lower temperature than before, conduits for successively delivering the expanded vapor as a cooling fluid to the first intermediate dephlegmator unit and then to the second primary dephlegmator unit, conduits for successively delivering the more volatile constituent that has been initially rectified in the first and second primary dephlegmator units to the first and then to the second intermediate dephlegmator units for further rectification therein, conduits for delivering the more volatile constituent from the third primary dephlegmator unit and from the second intermediate dephlegmator unit to the final dephlegmator unit for final rectification therein, a conduit for delivering the more volatile constituent resulting from said final rectification to the third primary dephlegmator unit as a cooling fluid, conduits for successively delivering a cold fluid from an external refrigeration cycle as a cooling fluid to the final dephlegmator unit and then to the second intermediate dephlegmator unit, and conduits for delivering the more volatile constituent from the third primary dephlegmator unit and the expanded vapor from the second primary dephlegmator unit after both have been partially warmed in said units to the countercurrent heat exchange means to effect said initial cooling of the mixture.

8. Apparatus for separating the constituents of a gaseous mixture that is initially at a high pressure and for recovering the more volatile constituent in a substantially pure state at substantially that initial pressure, said apparatus comprising countercurrent heat exchange means for receiving and initially cooling the mixture to about its dew point, conduits dividing the initially cooled mixture into two portions, two primary dephlegmator units, each unit being adapted to receive and initially rectify one of said portions so as to liquefy most of its less volatile constituent and separate that constituent from the more volatile constituent, an intermediate dephlegmator unit for receiving and further rectifying the more volatile constituent resulting from the initial rectification of one of said portions in the first primary dephlegmator unit, a final dephlegmator unit for receiving and finally rectifying the more volatile constituent resulting from the initial rectification of the other of said portions in the second primary dephlegmator unit and that resulting from said further rectification in the intermediate dephlegmator unit, a throttle valve for expanding liquefied less volatile constituent resulting from said rectification to substantially atmospheric pressure to lower its temperature, a conduit for delivering the expanded less volatile constituent as a cooling fluid to the first primary dephlegmator unit, a conduit for delivering the more volatile constituent resulting from said final rectification to the second primary dephlegmator unit as a cooling fluid, conduits for successively delivering a cold fluid from an external refrigeration cycle as a cooling fluid to the final dephlegmator unit and then to the intermediate dephlegmator unit, and conduits for delivering the more volatile constituent from the second primary dephlegmator unit and the expanded less volatile constituent from the first primary dephlegmator unit after both have been partially warmed in said units to the countercurrent heat exchange means to effect said initial cooling of the mixture.

9. A method of separating the constituents of a gaseous mixture that is initially at a high pressure and of recovering the more volatile constituent at substantially that initial pressure, that includes the following steps: initially cooling the mixture to about its dew point, preliminarily rectifying the mixture by dephelgmation to liquefy most of the less volatile constituent and thereby separate most of that constituent from the more volatile constituent, further rectifying by dephlegmation the unliquefied fraction separated in the preliminary rectification to increase the purity of the more volatile constituent by liquefying and separating more of the less volatile constituent, expanding the liquefied less volatile constituent separated in both said rectifications to an intermediate pressure to lower its temperature, utilizing the expanded liquefied constituent as a cooling agent in said preliminary rectification and thereby vaporize that constituent, expanding the resulting vaporized constituent with performance of external work to substantially atmospheric pressure to recool that constituent to a lower temperature than before, successively utilizing the expanded less volatile constituent as a cooling agent in said further rectification and then in said preliminary rectification, utilizing at substantially its initial pressure the more volatile constituent separated in said further rectification as a cooling agent in said preliminary rectification, and finally utilizing both the more volatile constituent and the expanded less volatile constituent after each has been used as a cooling agent in said preliminary rectification to effect the initial cooling of the mixture.

10. Apparatus for separating the constituents of a gaseous mixture that is initially at a high pressure and for recovering the more volatile constituent at substantially that initial pressure, said apparatus comprising heat exchange means for receiving and initially cooling the mixture to about its dew point, a primary dephlegmator for receiving and preliminarily rectifying the initially cooled mixture to liquefy and separate most of the less volatile constituent, a secondary dephlegmator for receiving and further rectifying the unliquefied fraction separated in the primary dephlegmator to increase the purity of the more volatile constituent by liquefying and separating more of the less volatile constituent by heat exchange with a colder fluid other than the more volatile constituent separated in said further rectification, expansion means for expanding the less volatile constituent separated in said dephlegmators to lower its temperature, conduits for conducting expanded less volatile constituent as a cooling agent to the primary dephelgmator and then to the heat exchange means, a conduit for conducting the more volatile constituent separated in the secondary dephlegmator directly to the primary dephlegmator for use as a cooling agent therein, and a conduit for conducting the more volatile constituent from the primary dephlegmator to the heat exchange means for use as a cooling agent in the initial cooling of the mixture.

11. Apparatus for separating the constituents of a gaseous mixture that is initially at a high pressure and for recovering the more volatile constituent at substantially that initial pressure, said appaartus comprising heat exchange means for receiving and initially cooling the mixture to about its dew point, a primary dephlegmator for receiving and preliminarily rectifying the initially cooled mixture to liquefy and separate most of the less volatile consttiuent, a secondary dephlegmator for receiving and further rectifying the mixture to increase the purity of the more volatile constituent by liquefying and separating more of the less volatile constituent, expansion means for expanding the liquefied less volatile constituent separated in both dephlegmators to an intermediate pressure to lower its temperature, conduits for conducting the expanded liquefied constituent as a cooling fluid to the primary dephlegmator and thereby vaporize that constituent, a second expansion means for receiving and expanding to substantially atmospheric pressure with performance of external work the less volatile constituent vaporized in the primary dephlegmator to recool that constituent to a lower temperature than before, conduits for successively conducting the expanded vaporized constituent as a cooling fluid from the second expansion means to the secondary dephlegmator and then to the primary dephlegmator, conduits for conducting the more volatile constituent separated in the secondary dephlegmator directly to the primary dephlegmator as a cooling fluid therein, and conduits for conducting the more volatile constituent and the expanded less volatile constituent from the primary dephlegmator to the heat exchange means as cooling fluids for the initial cooling of the mixture.

IRVING ROBERTS.

REFERENCES CITED

The following references are of record in the file of this patent:

UNITED STATES PATENTS

| Number | Name | Date |
|---|---|---|
| 1,212,455 | Claude | Jan. 16, 1917 |
| 1,537,193 | Roberts et al. | May 12, 1925 |
| 1,620,192 | Claude | Mar. 8, 1927 |
| 1,782,287 | Claude | Nov. 18, 1930 |
| 1,865,135 | Pollitzer et al. | June 28, 1932 |
| 1,958,553 | Van Nuys | May 15, 1934 |
| 2,071,763 | Pollitzer | Feb. 23, 1937 |

FOREIGN PATENTS

| Number | Country | Date |
|---|---|---|
| 658,477 | France | Jan. 25, 1929 |